(12) United States Patent
Lee et al.

(10) Patent No.: US 11,070,709 B2
(45) Date of Patent: Jul. 20, 2021

(54) ALIGNING AN IMAGE SENSOR RELATIVE TO A LENS MODULE

(71) Applicant: ASM Technology Singapore Pte Ltd, Singapore (SG)

(72) Inventors: Man Yip Lee, Tsing Yi (HK); Fan Leuk Lai, Lei King Wan (HK); Po Lam Au, Ma on Shan (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 0 days.

(21) Appl. No.: 16/382,667

(22) Filed: Apr. 12, 2019

(65) Prior Publication Data

US 2020/0329181 A1 Oct. 15, 2020

(51) Int. Cl.
*H04N 5/225* (2006.01)
*G02B 27/62* (2006.01)
*H04N 17/00* (2006.01)

(52) U.S. Cl.
CPC ........... *H04N 5/2254* (2013.01); *G02B 27/62* (2013.01); *H04N 17/002* (2013.01)

(58) Field of Classification Search
CPC ..... H04N 5/2254; H04N 17/002; G02B 27/62
USPC ............. 348/181, 95, 345; 359/665; 353/69; 29/700, 721, 407.09; 324/750.05; 600/109
See application file for complete search history.

(56) References Cited

U.S. PATENT DOCUMENTS

| | | | | |
|---|---|---|---|---|
| 10,187,636 | B2* | 1/2019 | Wong | H04N 17/002 |
| 2006/0119800 | A1* | 6/2006 | Burnett | G03B 21/10 |
| | | | | 353/69 |
| 2010/0264949 | A1* | 10/2010 | Hobbs | G01R 31/2889 |
| | | | | 324/750.05 |
| 2013/0047396 | A1* | 2/2013 | Au | B23Q 17/22 |
| | | | | 29/407.09 |
| 2013/0162983 | A1* | 6/2013 | Tan | G01M 11/0292 |
| | | | | 356/124 |
| 2014/0364691 | A1* | 12/2014 | Krivopisk | A61B 1/00096 |
| | | | | 600/109 |
| 2015/0286033 | A1* | 10/2015 | Osborne | G02B 13/0015 |
| | | | | 348/345 |
| 2016/0274350 | A1* | 9/2016 | Aizenfeld | G02B 23/2438 |
| 2017/0201744 | A1* | 7/2017 | Wong | H04N 17/002 |
| 2018/0180859 | A1* | 6/2018 | Sugita | G02B 7/04 |
| 2018/0252893 | A1* | 9/2018 | Park | H04N 5/23287 |
| 2019/0227199 | A1* | 7/2019 | Kao | G02B 27/0955 |
| 2019/0231220 | A1* | 8/2019 | Refai | A61B 1/00 |

* cited by examiner

*Primary Examiner* — Brian P Yenke
*Assistant Examiner* — Sean N. Haiem
(74) *Attorney, Agent, or Firm* — Ostrolenk Faber LLP

(57) ABSTRACT

A method for aligning an image sensor relative to a lens module, the method comprising the steps of: receiving a test image along a first optical path with the lens module and projecting the test image along a second optical path transverse to the first optical path with the lens module; manipulating an orientation of the lens module with respect to the image sensor to project the test image along the second optical path onto the image sensor; using the test image received by the image sensor along the second optical path to determine a corrected orientation of the lens module with respect to the image sensor, so as to align the lens module with respect to the image sensor; and thereafter fixing the aligned lens module to the image sensor.

21 Claims, 11 Drawing Sheets

ALIGNING AN IMAGE SENSOR RELATIVE TO A LENS MODULE

FIELD OF THE INVENTION

The invention relates to a method for aligning an image sensor relative to a lens module and an apparatus for aligning an image sensor relative to a lens module.

BACKGROUND

Imaging modules are commonly used in portable consumer devices such as mobile phones, tablets and notebook computers to provide imaging capabilities. Due to the improvement of technology, higher-quality imaging modules are being used in these mobile devices. Therefore, the alignment between a lens module and an image sensor in such an imaging module becomes very important for achieving better image quality during image capturing.

During the assembly of an imaging module, such as that found in a camera for portable consumer devices, it is necessary to align a focusing lens of the lens module and the image sensor in order to achieve the best image quality. Conventionally, the alignment process involves an apparatus which has particular assumptions about the orientation of the optical path and the arrangement of the image sensor. Such an apparatus may be unsuitable for aligning some imaging modules.

It would be beneficial to provide an apparatus suited to aligning those imaging modules.

SUMMARY OF THE INVENTION

It is thus an object of this invention to seek to provide a technique which overcomes at least some of the aforementioned problems of the prior art.

According to a first aspect of the present invention, there is provided a method for aligning an image sensor relative to a lens module, the method comprising the steps of: receiving a test image along a first optical path with the lens module and projecting the test image along a second optical path transverse to the first optical path with the lens module; manipulating an orientation of the lens module with respect to the image sensor to project the test image along the second optical path onto the image sensor; using the test image received by the image sensor along the second optical path to determine a corrected orientation of the lens module with respect to the image sensor, so as to align the lens module with respect to the image sensor; and thereafter fixing the aligned lens module to the image sensor.

The first aspect recognizes that a problem with an aligning image sensors with some lens modules is that the optical path in some lens modules may make performing such alignment difficult. Accordingly, a method is provided. The method may be to align an image sensor with respect to a lens module to enable the image sensor to be fixed to the lens module. The method may comprise receiving a test image at a lens module. The test image may be projected onto the lens module over a first optical path. The lens module may project the test image over a second optical path. The first and second optical paths may be transverse or oblique to each other. The method may comprise manipulating an orientation or location of the lens module with respect to the image sensor in order to project the test image onto the image sensor over the second optical path. The method may comprise using the test image which is received by the image sensor over the second optical path to determine, establish or calculate a corrected or adjusted orientation of the lens module with respect to the image sensor which aligns the lens module with the image sensor. The method may comprise fixing or connecting the lens module to the image sensor with the corrected orientation. In this way, the test image is provided in the correct orientation for the lens module and the orientation of the lens module with respect to the image sensor is manipulated in order to create a test image which can be used to determine the correct orientation between the lens module and the image sensor when the two are fixed together.

In one embodiment, an orientation of the second optical path with respect to the first optical path is due to reflection by at least one optical element comprised in the lens module. Accordingly, the change in the orientation of the optical paths may be caused by a reflective surface provided by an optical element of the lens module.

In one embodiment, the first optical path is parallel to a receiving surface of the image sensor and the second optical path is transverse to the receiving surface of the image sensor. Accordingly, the first optical path may run parallel to the surface of the image sensor. The second optical path may be transverse or incident onto the receiving surface of the image sensor.

In one embodiment, the first and second optical paths are perpendicular.

In one embodiment, the first optical path is horizontal and said second optical path is vertical. Hence, the first optical path may extend in a horizontal plane to match the plane in which the image sensor is orientated and the second optical path may be extend in a vertical plane.

In one embodiment, the step of manipulating comprises moving at least one of the lens module and the image sensor relative to the other. Accordingly, the lens module and/or the image sensor may be moved in relation to each other.

In one embodiment, the step of manipulating comprises gripping at least one of the lens module and the image sensor with a gripper and actuating the gripper to move at least one of the lens module and the image sensor relative to the other. Accordingly, the lens module and/or the image sensor may be held by a gripper and the gripper may be controlled to move the lens module and/or the image sensor with respect to each other.

In one embodiment, the step of manipulating comprises moving an optical element relative to another optical element comprised in the lens module. Accordingly, an optical element within the lens module may be moved with respect to another optical element.

In one embodiment, the step of manipulating comprises moving an optical element relative to the image sensor. Accordingly, an optical element within the lens module may be moved with respect to the image sensor.

In one embodiment, the step of manipulating comprises providing signals to drive optical element actuators to move the optical element relative to another optical element comprised in the lens module. Accordingly, signals may be provided which actuate optical element actuators which move the optical element with respect to another optical element within the lens module.

In one embodiment, the step of manipulating comprises providing signals to drive optical element actuators to move the optical element relative the image sensor. Accordingly, signals may be provided which actuate optical element actuators which move the optical element with respect to the image sensor.

In one embodiment, the optical element actuators are operable in use by the lens module to provide optical image stabilization. Accordingly, the optical element actuators may actuate the optical element to provide optical image stabilization.

In one embodiment, the step of providing signals comprises connecting a pogo pin interface to the lens module, wherein the signals are provided over the pogo pin interface. Accordingly, an electrical interface may be provided on the gripper which connects with an electrical interface on the lens module and over which signals are provided to drive the optical element actuators.

In one embodiment, the optical element comprises at least one of a mirror and a prism. Accordingly, the optical element may comprise a mirror and/or a prism.

In one embodiment, the lens module further comprises an imaging zoom lens and the step of manipulating occurs with the imaging zoom lens positioned to provide minimal imaging zoom. Accordingly, an imaging zoom lens of the lens module may be positioned to provide the least amount of zoom during manipulation.

In one embodiment, the test image comprises at least one unique image positioning feature. Accordingly, a visually-unique feature or pattern may be provided on the test image.

In one embodiment, the test image comprises a plurality of positioning features which are different from the unique image positioning feature. Accordingly, other positioning features may be provided to help with positioning the lens module with respect to the image sensor.

In one embodiment, the unique image positioning feature is centrally-located within the test image and the plurality of positioning features are positioned around the unique image positioning feature. Hence, the unique image positioning feature may be located towards the central part of the test image.

In one embodiment, the unique image positioning feature comprises a central contrasting area.

In one embodiment, the method further comprises the step of determining a location of the unique image positioning feature projected on the image sensor and the step of manipulating comprises moving at least one of the lens module and the image sensor to locate the unique image positioning feature at a positioning location on the image sensor. Accordingly, the location of the unique image positioning feature on the image sensor may be established and the lens module and/or the image sensor may be moved to reposition that unique image positioning feature at a desired positioning location on the image sensor.

In one embodiment, the method comprises setting an imaging zoom lens of the lens module to an infinity focus position when determining the location of the unique image positioning feature on the image sensor.

In one embodiment, the method comprises setting the imaging zoom lens of the lens module to an increased zoom position, repeatedly determining the location of the unique image positioning feature on the image sensor and moving at least one of the lens module and the image sensor to locate the unique image positioning feature at a positioning location on the image sensor. By increasing the zoom, the location of the unique image positioning feature may be more accurately positioned on the image sensor.

In one embodiment, the test image generator is orientated to project the test image along a first optical path.

In one embodiment, the test image generator is arranged to first project the image to a path changer which then projects the test image along the first optical path.

In one embodiment, the path changer comprises at least one of a mirror and a prism.

In one embodiment, the test image generator comprises lenses configured to project the test image with an infinite object distance.

According to a second aspect of the present invention, there is provided an apparatus configured to perform the method of the first aspect and its embodiments.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION

Before discussing embodiments of the invention in any more detail, first an overview will be provided. The embodiments provide an arrangement which uses a test image to adjust a position of a lens assembly with respect to an image sensor prior to fixing the lens assembly and image sensor together in that adjusted position to optically align the lens assembly and image sensor. In particular, the test image is provided along a first optical path to the lens assembly which alters the optical path of the test image to project that test image onto the image sensor. Typically, an optical element or component of the lens module which alters the optical path of the test image is re-oriented to project the test image correctly onto the image sensor and that test image is then used to establish the adjusted position with which to fix together the lens assembly and image sensor.

Camera Assembly

Figure 1A:
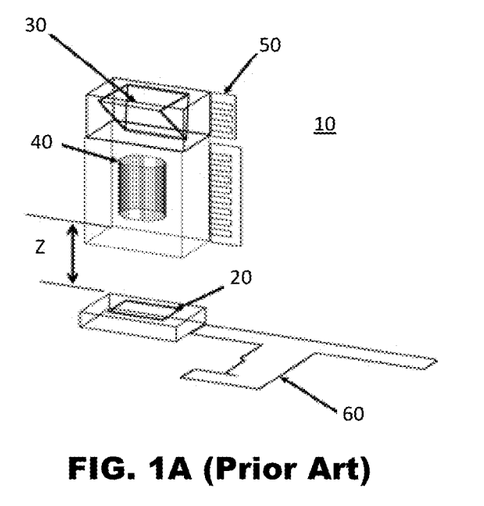
FIGS. 1A and 1B illustrate a typical "folded camera" arrangement of the prior art comprising a lens module and an image sensor which need to be optically aligned.
Figure 1B:
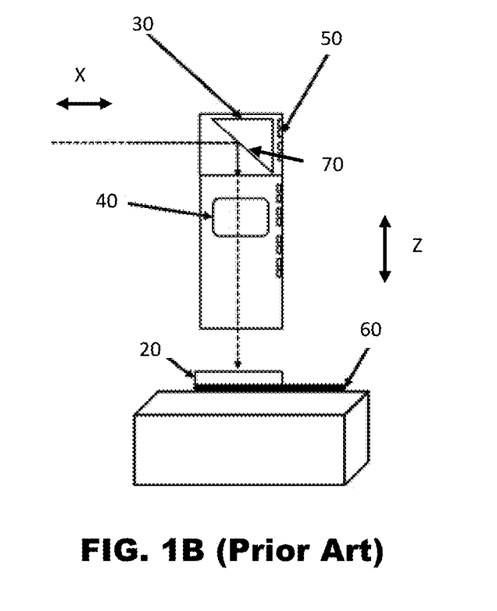

FIGS. 1A and 1B illustrate a typical "folded camera" arrangement of the prior art comprising a lens module 10 and an image sensor 20 which need to be optically aligned. These folded digital camera modules are becoming more popular on mobile phones; and due to its complex optical path structure and optical image stabilization (OIS) system, it is not possible to run an active alignment process on this kind of folded camera using a conventional alignment apparatus. In particular, the conventional alignment apparatus cannot handle the folded camera device as the second optical path (provided by the folding element or prism) is now perpendicular to the first optical axis; and hence the image sensor will become vertical (i.e. not horizontal) when keeping the first optical path in the vertical direction. Having the image sensor not located on a horizontal plane will make it very difficult to conduct glue dispensing to fix the lens position after aligning the lens module and image sensor in a corrected tilt condition.

The folded camera usually contains two important parts: an autofocus (AF) module to move a tele-lens assembly 40 up/down to focus at different object distances; and an optical image stabilization (OIS) module to provide tilting movement on the folded camera's built-in prism 30 (or mirror) in order to stabilize the image while taking pictures.

During the folded camera active alignment (AA) process, the tele-lens assembly 40 should be attached to the image sensor 20 by finding the best focusing plane to allow the image sensor 20 to get a sharp focus at 4 corners of a test chart at the same time.

The lens module 10 comprises the prism 30 (which provides automatic image stabilisation for the camera in use) and the tele-lens assembly 40 (which provides an optical zoom for the camera in use). The lens module 10 comprises a pogo pin connector 50. The pogo pin connector 50 receives signals which control the physical positioning of the prism 30 and the tele-lens assembly 40 using onboard actuators (not shown). That is to say, signals may be provided which alter the position and/or orientation of both the prism 30 and the tele-lens assembly 40. Typically, the prism 30 is rotatable about multiple degrees of freedom and the tele-lens assembly 40 is displaceable along at least the Z axis. The image sensor 20 is coupled with a flexible printed circuit board 60, which conveys signals to and from the image sensor 20.

As can be seen in FIG. 1B, an image being projected in along the X axis onto a reflective major surface 70 of the prism 30 is reflected along the Y axis, which is orthogonal to the X axis, through the tele-lens assembly 40 and onto the image sensor 20. In this example, the image sensor 20 lies horizontally and so is orientated to receive a vertically-projected image from the lens module 10. The prism 30 is arranged to reflect an image at 90° to which it is received. Accordingly, the image received along the X axis is parallel to the receiving surface of the image sensor 20.

Alignment Apparatus Overview

Figure 2A:
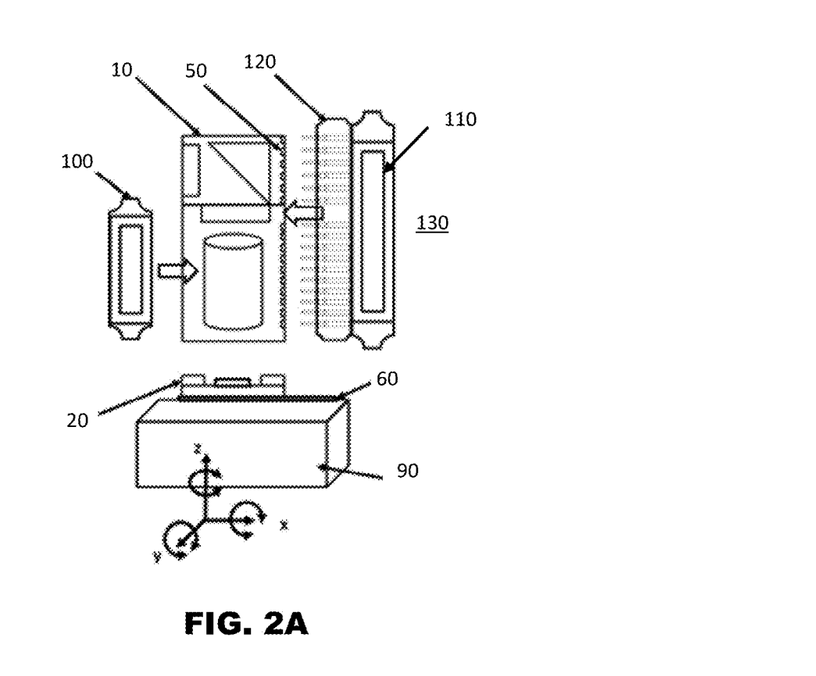
FIGS. 2A and 2B are schematic diagrams showing components of an alignment apparatus according to one embodiment.
Figure 2B:
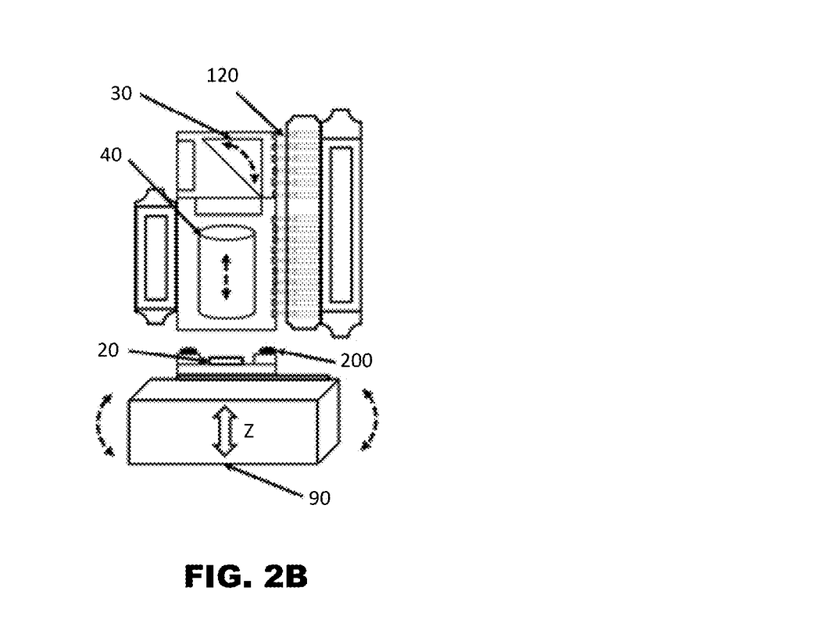

FIGS. 2A and 2B are schematic diagrams showing components of an alignment apparatus according to one embodiment.

The image sensor 20 is mounted on an image sensor unit holding assembly 90 having 6 degrees of freedom. This provides for rotation of the sensor 20 about the X, Y and Z axes, as well as displacement of the image sensor 20 along the X, Y and Z axes.

A lens gripper assembly 130 is provided which comprises a first gripper 100 which is displaceable to grip one side of the lens module 10 and a second gripper 110 which is displaceable to grip an opposing side of the lens module 10. The second gripper 110 is provided with a set of pogo pins 120 which couple with the pogo pin connector 50. As can be seen in FIG. 2B, the image sensor unit holding assembly 90 is operable to reposition the image sensor 20 and the lens gripper assembly 130 provides signals which control the positioning of the prism 30 and the tele-lens assembly 40.

Figure 3:
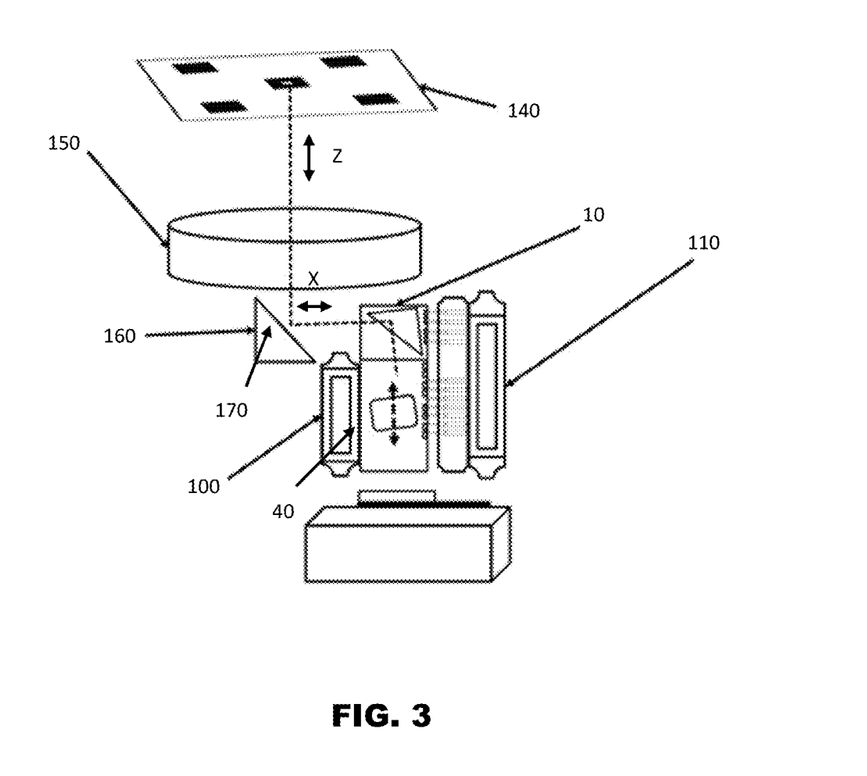
FIG. 3 is a schematic diagram showing components of an alignment apparatus according to one embodiment.

As can be seen in FIG. 3, the apparatus comprises three major parts, namely: the relay lens 150, the lens gripper assembly 130 and the image sensor unit holding assembly 90. A test chart 140 is provided which projects a test chart image through the relay lens 150 (which sets the focal length of the test image to infinity) and onto a relay prism 160. The relay prism 160 has a reflecting major surface 170 which reflects the received image. In particular, the optical path of the test image is reflected through 90° to be received by the lens module 10. In other words, the test image is projected along the Z axis through the relay lens 150 onto the relay prism 160 which projects the test image along the X axis onto the prism 30.

Hence, the additional relay prism 160 (prism mirror) is added beneath the relay lens 150 and thus the folded camera first optical path can remain in the horizontal direction while the image sensor 20 can sit on a horizontal plane (which makes it easier for dispensing and holding glue on the surface of the image sensor 20).

Also, adding the actuator on the image sensor unit holding assembly 90 having 6 degrees of freedom provides for up to 12 degrees of freedom to carry out the alignment process for the folded camera. This avoids any further changes which are needed for the second optical path if the lens gripper assembly 130 is used to correct the lens module tilting condition as the folded camera's prism 30 will otherwise also be tilted if any tilting movement is made to the lens gripper assembly 130 itself.

Alignment Operation

Figure 4A:
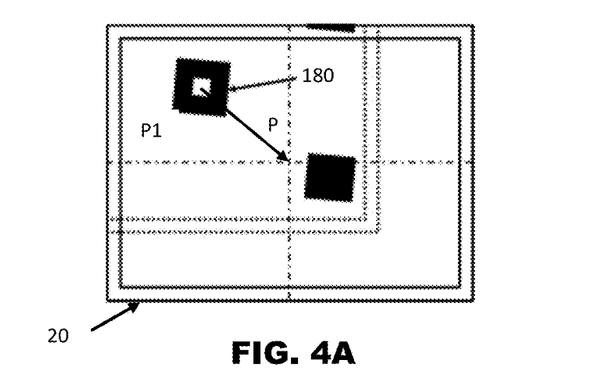
FIGS. 4A to 4C illustrate an initial alignment operation.

As can be seen in FIG. 4A, signals are provided to displace the tele-lens assembly 40 (if required) to a position which provides for least optical zoom. The initial image provided by the image sensor 20 is examined and the location of the central alignment feature 180 on the image sensor 20 is determined. In this example, the central alignment feature 180 is determined to be at position P1.

Figure 4B:
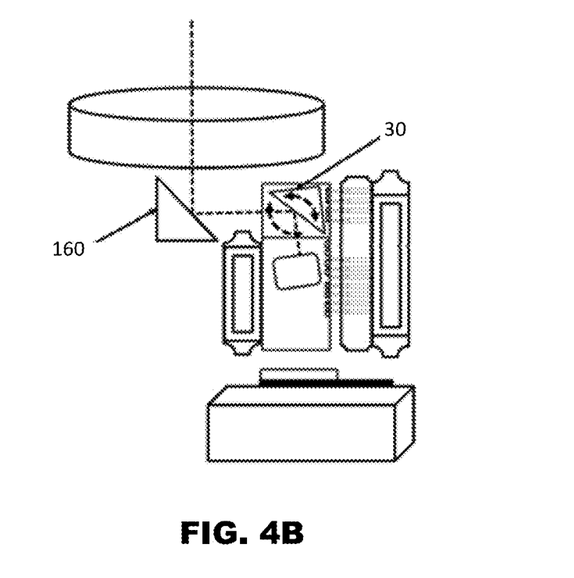

As shown in FIG. 4B, signals are provided change the positioning of the prism 30 to adjust the position of the central alignment feature 180 from its currently-projected position P1 on the image sensor 20 to the position P2 by applying a translation P.

Figure 4C:
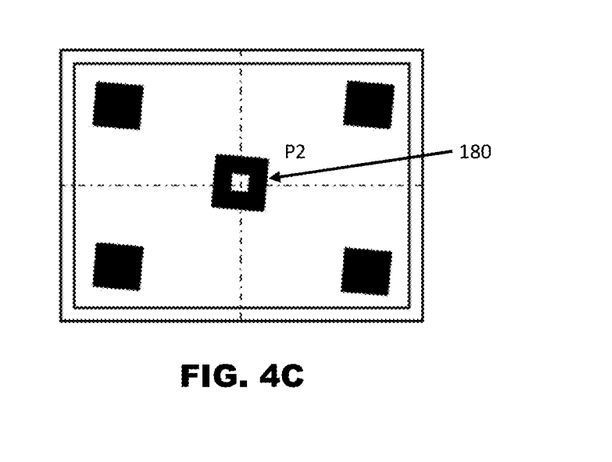

Thus, as shown in FIG. 4C, the central alignment feature 180 becomes positioned centrally on the image sensor 20.

As an optional further step, signals may be provided to the tele-lens assembly 40 to increase the imaging zoom and the position of the central alignment feature 180 may be rechecked and realigned to the position P2, if necessary.

Figure 5A:
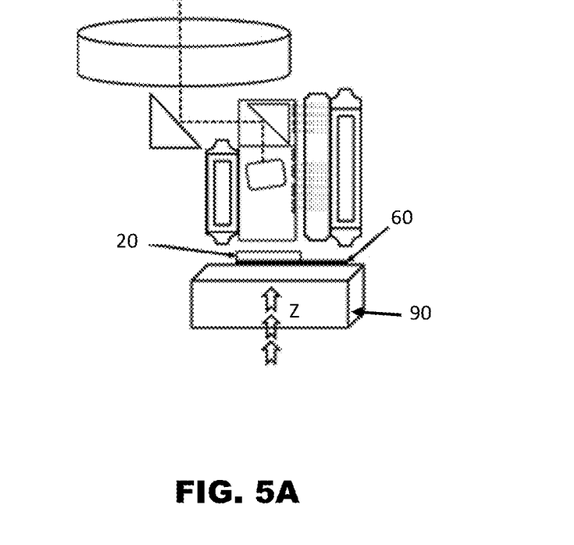
FIGS. 5A to 5D illustrate further steps in the initial alignment and fixing operation.

Next, as shown in FIG. 5A, signals are provided to restore the tele-lens assembly 40 to the position with the least amount of zoom (if required) and the image sensor unit holder assembly 90 is translated along the Z axis in order to obtain scan curves and determining a relative tilt (alignment correction) between the lens module 10 and the image sensor 20 following the technique as disclosed in U.S. Pat. No. 10,187,636 B2 entitled "Active Lens Alignment System", the contents of which are incorporated herein by reference.

Figure 5B:
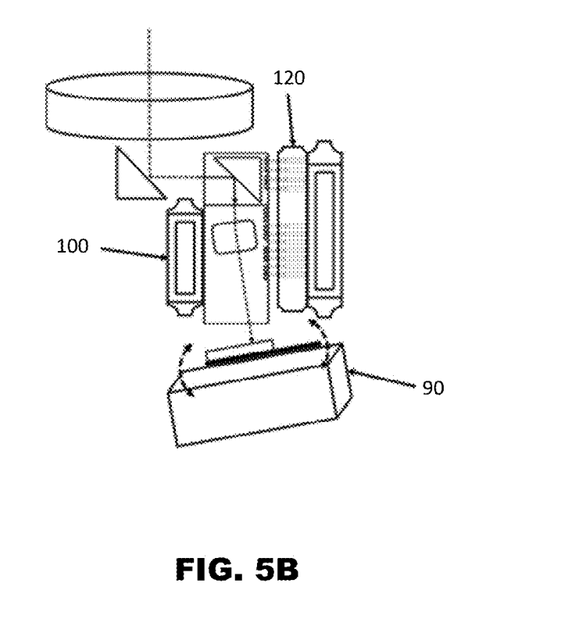
Figure 5C:
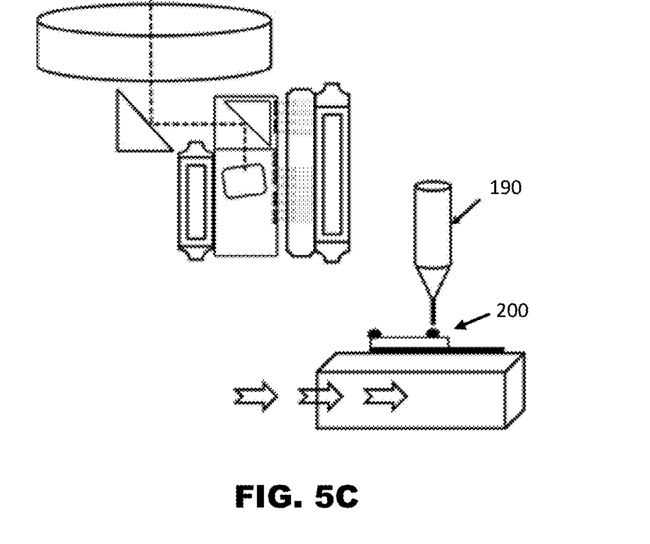

As shown in FIG. 5B, the determined tilt is applied to the image sensor unit holding assembly 90 and a focusing score is then checked. Assuming that the focusing score is satisfactory, then, as shown in FIG. 5C, the image sensor unit holding assembly is displaced to a glue-dispensing station where a glue dispenser 190 dispenses glue 200 onto the image sensor 20.

Figure 5D:
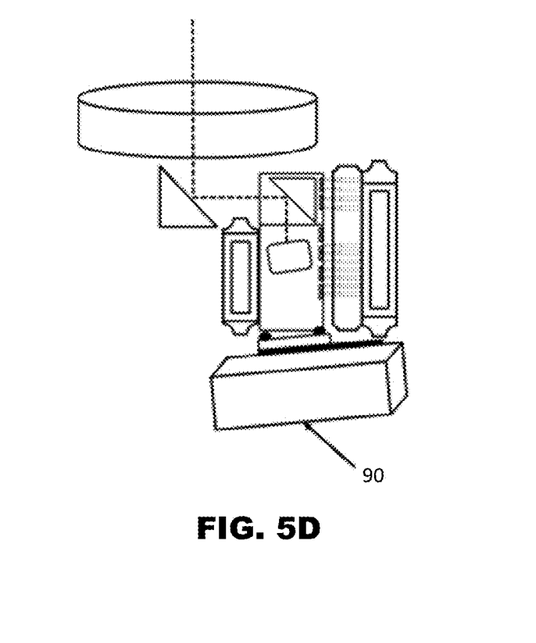

As shown in FIG. 5D, the image sensor unit holding assembly 90 returns to the position below the lens module 10, applies the determined tilt (alignment correction) and translates in the direction Z to position the image sensor 20 with the determined orientation with respect to the lens module 10. The focusing score is then rechecked and, assuming that the rechecking confirms that the alignment is accurate, then the UV glue 200 is cured. This fixes the image sensor 20 in the correct orientation with respect to the lens module 10 to achieve optical alignment.

It will be appreciated that in other embodiments, the glue 200 may be applied prior to determining the tilt, in order to avoid needing to move to the dispensing station after the correct alignment has been determined.

Also, it will be appreciated that the lens gripper assembly 130 may also or alternatively be provided with 6 degrees of freedom movement capability in order to move the lens module 10 with respect to the image sensor 20.

Figure 10:
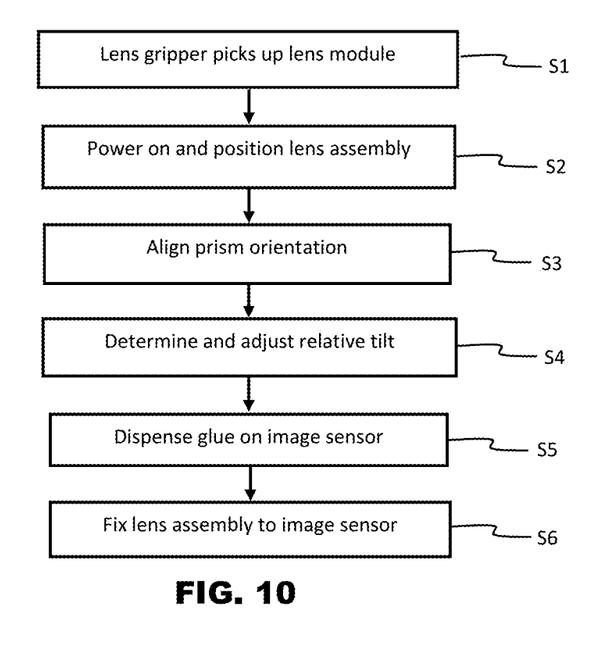
FIG. 10 is a flowchart showing the main aligning steps according to one embodiment.

FIG. 10 is a flow chart illustrated the main steps, which can be summarised as follows:

At step S1, use the lens gripper assembly 130 to pick up the (folded camera) lens module 20, and the pogo pin connector holder 120 will also make contact with the connecting-IO pads 50 on the lens module 20 after this picking-up process.

At step S2, power on both the AF and OIS module inside the lens module 20, and then move the tele-lens assembly 40 to the target bonding position under the relay lens 150 and the relay prism (mirror) 160.

At step S3, check the central alignment feature 180 from the folded camera captured image and then calculate how to align the prism 30 orientation in order to make it parallel with the relay prism 160.

At step S4, move the image sensor 20 in the Z-direction to obtain the scan curves and then determine the relative-tilt between the image sensor 20 the tele-lens assembly 40. Check the focusing score after aligning the tilt of image sensor 20 by the image sensor unit holder 90.

At step S5, move the image sensor 20 to dispensing station to conduct UV glue dispensing on image sensor 20.

At step S6, move the image sensor unit holder 90 back to the alignment position and cure the UV glue to fix the tele-lens assembly 40 position with respect to the image sensor 20 (assuming the focusing score is confirmed after re-checking at the resumed best alignment position).

Alignment Apparatus Detail

Figure 6A:
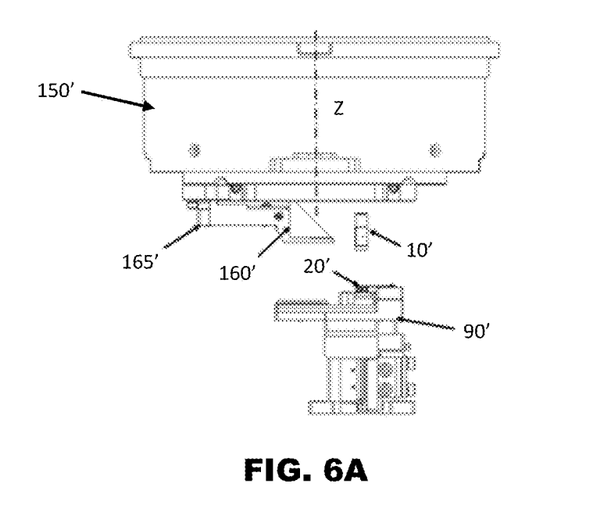
FIGS. 6A to 6F show components of an alignment apparatus according to one embodiment.
Figure 6B:
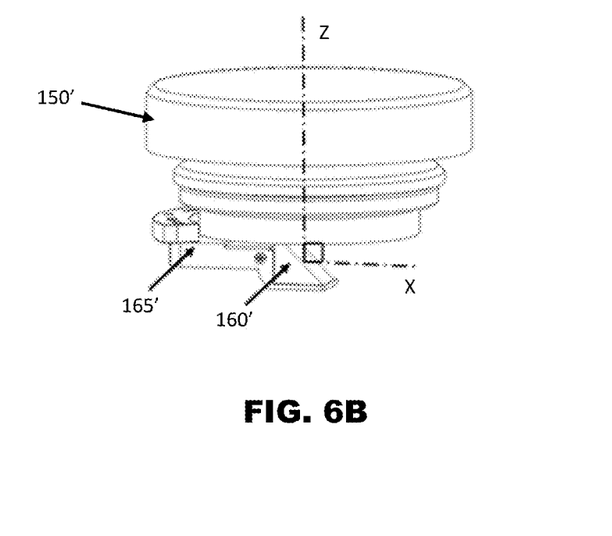

FIGS. 6A to 6F show an embodiment of the alignment apparatus in more detail. In particular, FIGS. 6A and 6B show a relay lens assembly 150' which projects the test image along the Z axis onto a relay prism 160' for projection along the X axis onto a lens module 10, which projects the image along the Z axis onto an image sensor 20, held by an image sensor unit holding assembly 90'.

Figure 6C:
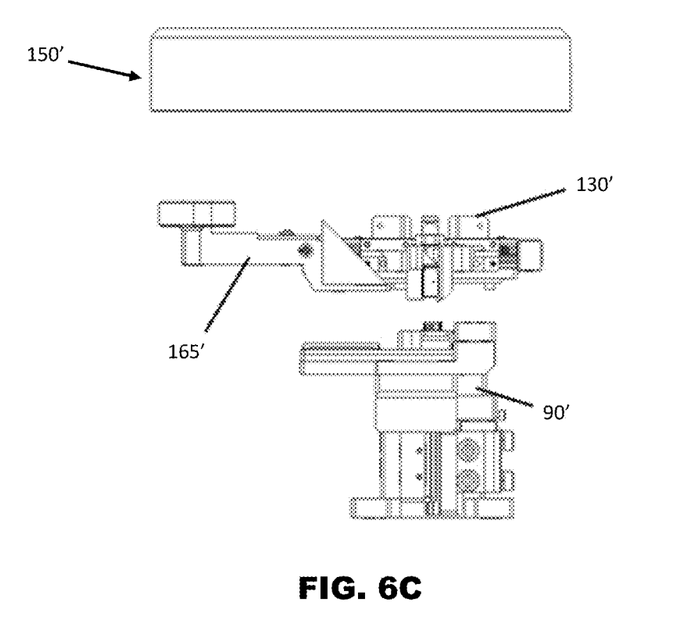
Figure 6D:
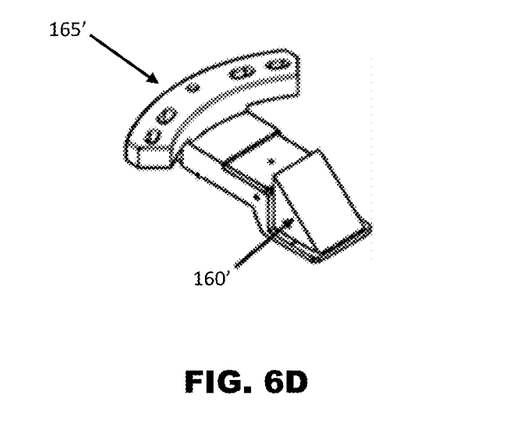
Figure 6E:
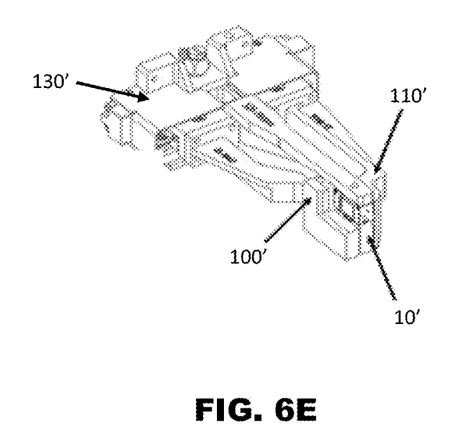

As shown in FIGS. 6C and 6E, the lens module 10' is held by a lens gripper assembly 130' having a first gripper 100' and a second gripper 110'.

As shown in FIG. 6D, the relay prism 160' is held by a relay prism holder 165'.

Figure 6F:
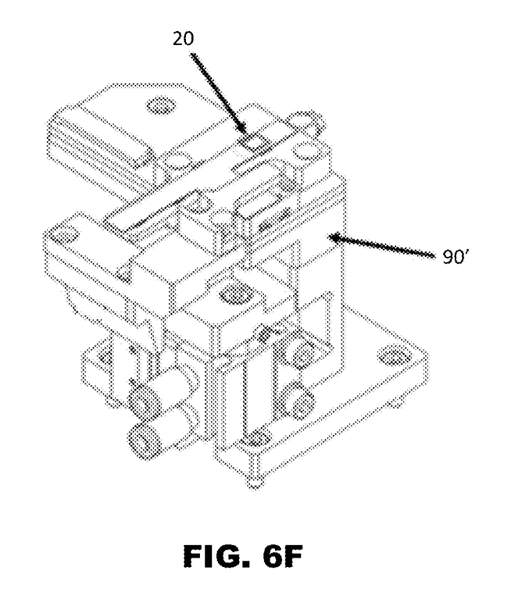

As shown in FIGS. 6C and 6F, the image sensor 20 is held by an image sensor unit holding assembly 90'.

Test Image Projection—Alternative 1

Figure 7:
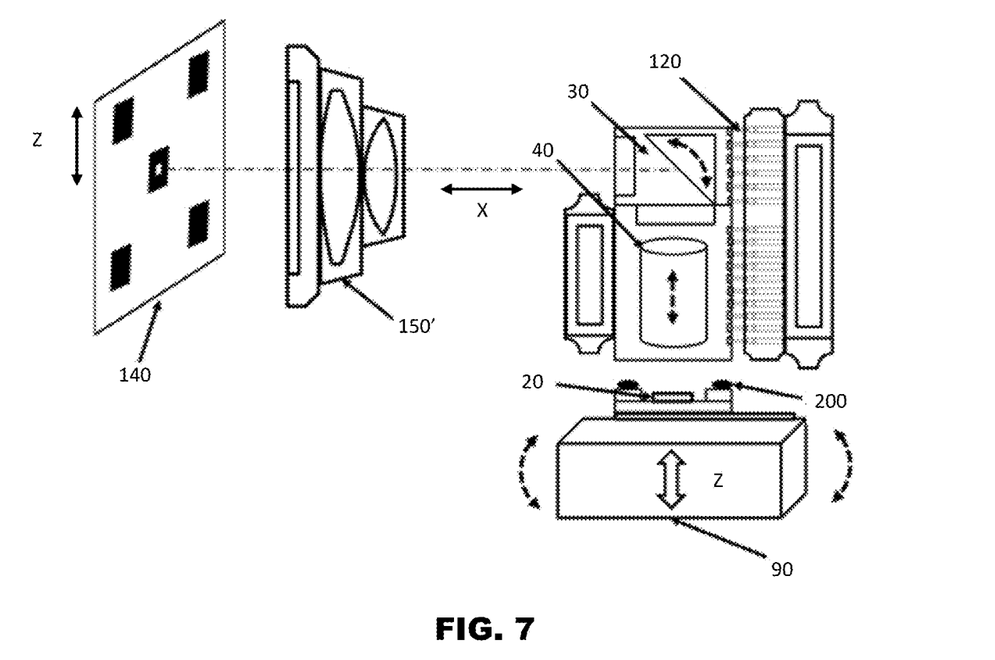
FIGS. 7 to 9 show different test projection arrangements according to various embodiments.

FIG. 7 shows an arrangement where the test chart 140 is orientated along a vertical plane on the Z axis, rather than along the X axis, as is the relay lens 150" in order to project the test image along the X axis onto the prism 30. In this arrangement, the relay lens 150" and the test chart 140 simulate a virtual vertical test-chart placed at the infinite object distance from the folded camera.

Test Image Projection—Alternative 2

Figure 8:
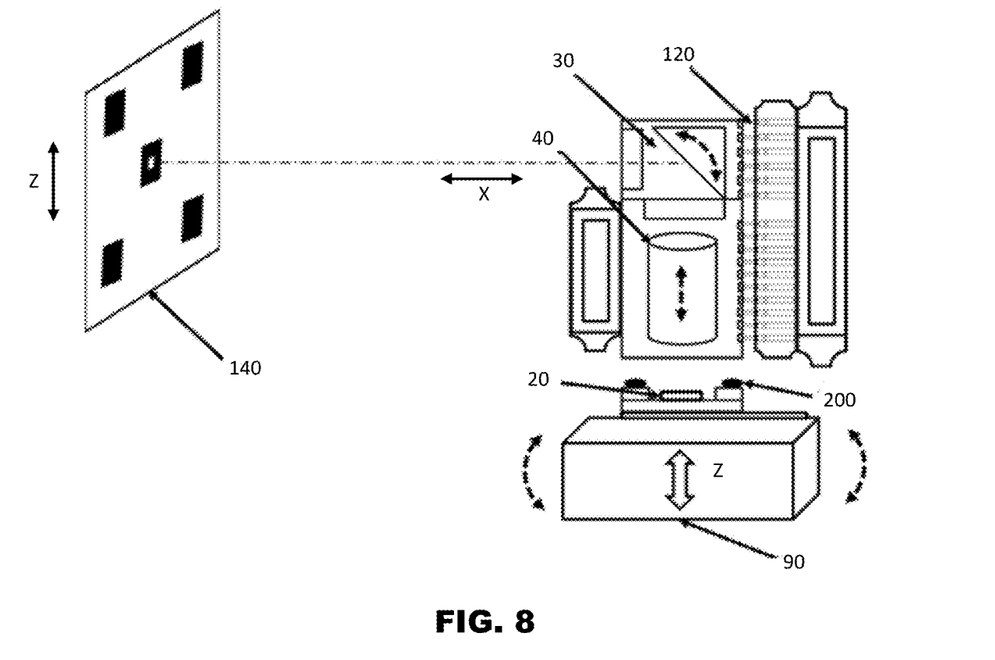

FIG. 8 shows a similar arrangement but omits the relay lens 150" and the test image is instead directly projected onto the prism 30. Hence, the test chart 140 is placed on a vertical plane to act as the test object of the folded camera to replace the function of the prism mirror.

Test Image Projection—Alternative 3

Figure 9:
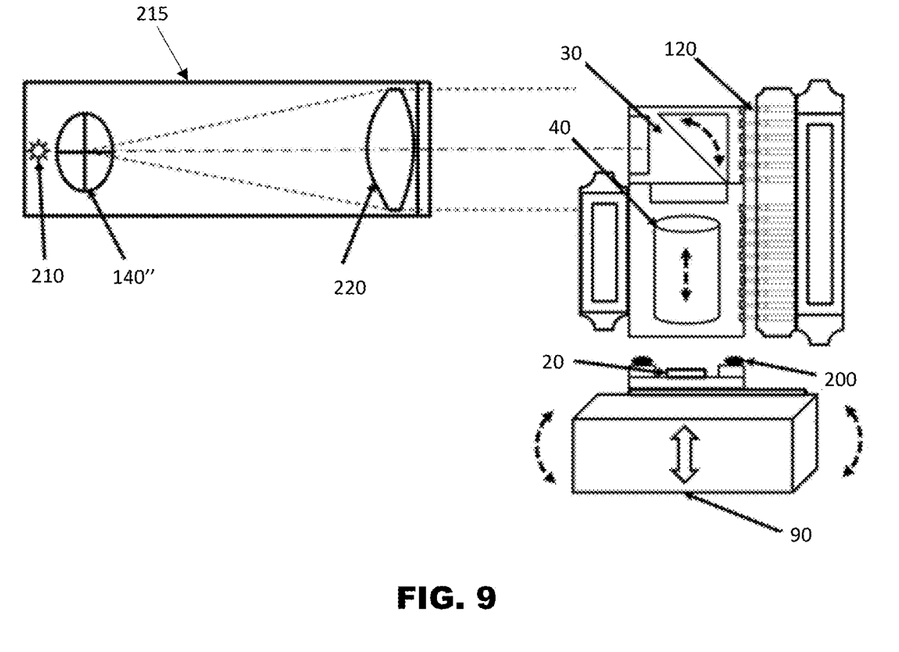

FIG. 9 shows an arrangement where the test image is generated by a light source 210 projecting through a test chart 140" onto a collimator lens 220 to provide a collimated image which projects along the X axis onto the image stabilization prism 30.

This arrangement uses a collimator 215 placed in a horizontal orientation to replace the relay lens and test chart configuration and provides parallel light rays to simulate an object placed at an infinite distance. The test chart 140" inside the collimator 215 will be much smaller in size when compared with the test chart 140 used with the relay lens. Thus, it should be printed with a higher image resolution when compared with the test chart 140. However, a collimator 215 usually has a cheaper production cost when compared with the relay lens arrangement.

Hence, it can be seen that by using an extra relay prism 160 or mirror installed beneath the relay lens 150, the optical path is diverted to the vertical direction and the bulky test chart assembly can then be located at the top of the apparatus for reducing its footprint. By changing the distance between the relay lens and the test chart, the simulated object distance can be adapted easily to different distance requirements for testing (while the equipment footprint can still be kept constant as the test chart only needs to be moved in vertical directions). Also, as both the AA head and image sensor holder assembly are now incorporated with 6-axis motor adjustment capability, the apparatus is thus able to achieve compensations in response to both camera lens-tilt errors and image sensor-tilt errors and this can improve the flexibility of this apparatus to fit different testing conditions.

Furthermore, the apparatus is able to support the so-called "True-optical" alignment (i.e. the image sensor is perfectly aligned/parallel with the test chart plane by using the sensor holder tilt correction action first; and the lens tilt-error is then compensated by the AA head tilt motion), while other conventional AA equipment is usually only capable of providing axis adjustment in 6 degrees of freedom on either the AA-head (i.e. lens-tilt) or sensor holder assembly (i.e. sensor tilt) by using the so-called "Scheimpflug Rule" or the "Hinge Rule". These Rules are used to find a particular tilted camera focus solution by just correcting only one of the two governing parameters: namely: the lens-tilt error or the sensor-tilt error. In addition, the variation in the "view direction" of the folded camera built-in prism mirror will be minimized, due to the use of the OIS control function to align the orientation of the prism mirror to ensure that the center feature of the test chart can always align with the center of the image sensor before carrying out Modulation Transfer Function (MTF)/Spatial Frequency Response (SFR) scanning on the tele-lens tilting condition. The center feature pattern is different from the pattern used in the conventional process and the provision of a hollow square inside the "black/dark" square feature pattern makes it easier to identify the location of this center feature when needing to correct/align the center feature position.

Although the present invention has been described in considerable detail with reference to certain embodiments, other embodiments are possible.

Therefore, the spirit and scope of the appended claims should not be limited to the description of the embodiments contained herein.

The invention claimed is:

1. A method for aligning an image sensor relative to a lens module, the lens module comprising a first optical element and a second optical element, the first optical element and the second optical element being movable relative to each other, and the method comprising the steps of:

gripping the lens module with a gripper;

while the lens module is being gripped by the gripper, electrically coupling an electrical interface carried on the gripper to an electrical interface on the lens module, the electrical interface being connected to the first optical element and the second optical element to provide drive signals that cause movement of the first optical element relative to the second optical element, or the second optical element relative to the first optical element, or the first optical element and the second optical element relative to each other;

receiving a test image along a first optical path with the lens module and projecting the test image along a second optical path transverse to the first optical path with the lens module;

manipulating an orientation of the lens module with respect to the image sensor to project the test image along the second optical path onto the image sensor;

adjusting the second optical path to position the test image centrally on the image sensor by providing the drive signals to the lens module via the electrical interface to move the first optical element relative to the second optical element, or to move the second optical element relative to the first optical element, or to move the first optical element and the second optical element relative to each other;

using the test image received by the image sensor along the second optical path to determine a corrected orientation of the lens module with respect to the image sensor, so as to align the lens module with respect to the image sensor; and thereafter fixing the aligned lens module to the image sensor.

2. The method of claim 1, wherein an orientation of the second optical path with respect to the first optical path is due to reflection by at least one optical element comprised in the lens module.

3. The method of claim 1, wherein the first optical path is parallel to a receiving surface of the image sensor and the second optical path is transverse to the receiving surface of the image sensor.

4. The method of claim 1, wherein the first optical path is horizontal and said second optical path is vertical.

5. The method of claim 1, wherein the step of manipulating comprises gripping at least one of the lens module and the image sensor with a gripper and actuating the gripper to move at least one of the lens module and the image sensor relative to the other.

6. The method of claim 1, wherein the step of manipulating comprises providing signals to drive optical element actuators to move the optical element relative to another optical element comprised in the lens module.

7. The method of claim 6, wherein the optical element actuators are operable in use by the lens module to provide optical image stabilization.

8. The method of claim 6, wherein the step of providing signals comprises connecting a pogo pin interface to the lens module, wherein the signals are provided over the pogo pin interface.

9. The method of claim 1, wherein the optical element comprises at least one of a mirror and a prism.

10. The method of claim 1, wherein the lens module further comprises an imaging zoom lens and the step of manipulating occurs with the imaging zoom lens positioned to provide minimal imaging zoom.

11. The method of claim 1, wherein the test image comprises at least one unique image positioning feature.

12. The method of claim 11, wherein the test image comprises a plurality of positioning features which are different from the unique image positioning feature.

13. The method of claim 12, wherein the unique image positioning feature is centrally-located within the test image and the plurality of positioning features are positioned around the unique image positioning feature.

14. The method of claim 11, wherein the unique image positioning feature comprises a central contrasting area.

15. The method of claim 11, further comprising the step of determining a location of the unique image positioning feature projected on the image sensor and the step of manipulating comprises moving at least one of the lens module and the image sensor to locate the unique image positioning feature at a positioning location on the image sensor.

16. The method of claim 11, comprising setting an imaging zoom lens of the lens module to an infinity focus position when determining the location of the unique image positioning feature on the image sensor.

17. The method of claim 11, comprising setting the imaging zoom lens of the lens module to an increased zoom position, repeatedly determining the location of the unique image positioning feature on the image sensor and moving at least one of the lens module and the image sensor to locate the unique image positioning feature at a positioning location on the image sensor.

18. The method of claim 1, comprising a test image generator orientated to project the test image along a first optical path.

19. The method of claim 18, wherein the test image generator is arranged to first project the image to a path changer which then projects the test image along the first optical path.

20. The method of claim 19, wherein the path changer comprises at least one of a mirror and a prism.

21. The method of claim 18, wherein the test image generator comprises lenses configured to project the test image with an infinite object distance.

* * * * *